United States Patent
Ferrara

[11] 3,810,675
[45] May 14, 1974

[54] VEHICLE SEAT CUSHION WITH RESILIENT BACK BAR

[75] Inventor: Rudolph A. Ferrara, Warren, Mich.

[73] Assignee: General Motors Corporation, Detroit, Mich.

[22] Filed: Oct. 12, 1972

[21] Appl. No.: 296,886

[52] U.S. Cl............... 297/460, 297/378, 297/218
[51] Int. Cl............................ A47c 7/20, B60n 1/06
[58] Field of Search ............. 297/94, 191, 216, 243, 297/378, 390, 445, 452, 458–460

[56] References Cited
UNITED STATES PATENTS

| | | | |
|---|---|---|---|
| 3,537,751 | 11/1970 | Inoue et al. | 297/460 |
| 3,695,706 | 10/1972 | Basher | 297/460 |
| 3,329,463 | 7/1967 | Zimmermann | 297/243 |

FOREIGN PATENTS OR APPLICATIONS

| | | | |
|---|---|---|---|
| 609,338 | 9/1960 | Italy | 297/243 |

Primary Examiner—Casmir A. Nunberg
Attorney, Agent, or Firm—Herbert Furman

[57] ABSTRACT

A seat cushion frame assembly includes a stamped seat pan having rearwardly extending upwardly curving side members. A resilient diaphragm is die-cut to provide a back bar and seat suspension members which are connected by uncut portions. Wire clips sewn to the diaphragm attach the ends of the back bar and seat suspension members in varying degrees of tension between the side members. The resilient back bar is positioned forwardly of the conventional rigid back bar to increase foot room for the rear seat occupant and by virtue of flexure assures the comfort of the front seat occupant.

3 Claims, 4 Drawing Figures

PATENTED MAY 14 1974　　　　　　　　　　　　　　　3,810,675
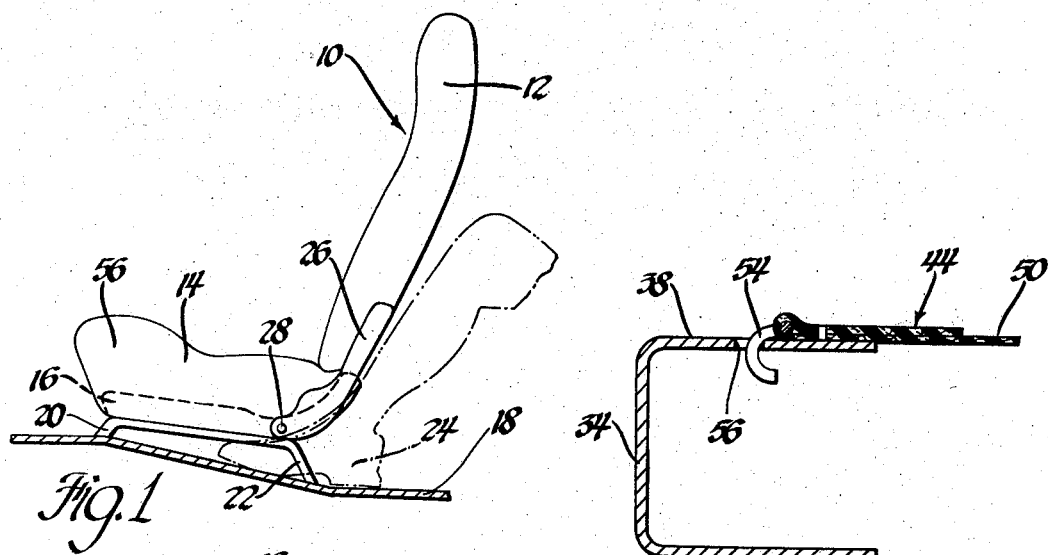
Fig.1
Fig.4
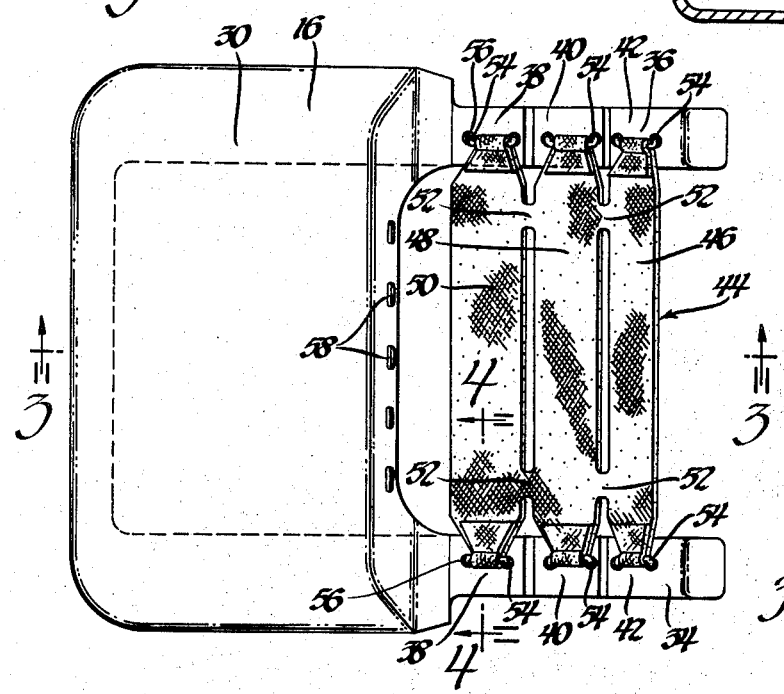
Fig.2
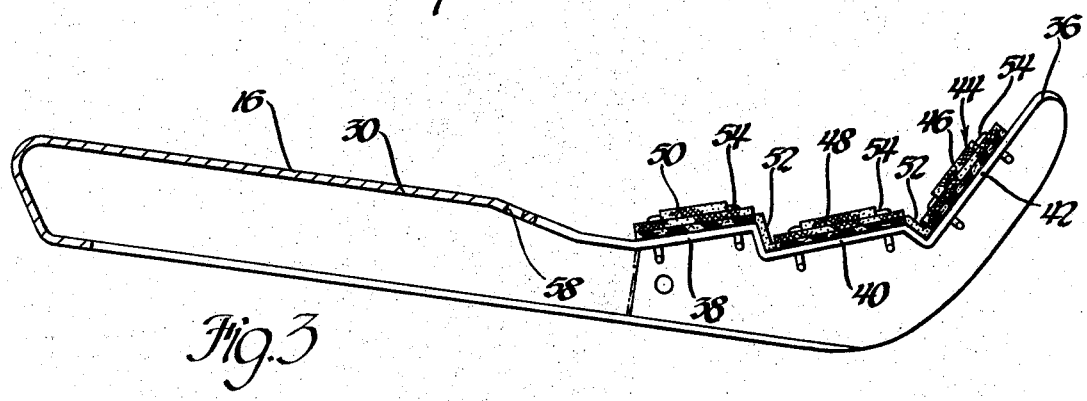
Fig.3

VEHICLE SEAT CUSHION WITH RESILIENT BACK BAR

The invention relates to a vehicle seat and more particularly to a front bucket seat cushion having a resilient back bar assembly.

It is known in motor vehicle bucket seats to provide a seat cushion frame comprising a rigid rectangular frame including a rigid back bar. The rigid back bar is located rearward of that area of the seat cushion contacted by the seated occupant so as not to affect the feel of the seat. Resilient suspension members such as strips of fabric or wire springs are mounted on the rigid frame to support the seat cushion.

It is desirable to provide a front bucket seat cushion frame and assembly which minimizes interference with foot and leg room of the rear seat occupant. The rigid back bar of the prior art has the disadvantage of limiting the foot room available to the rear seat occupant.

According to the present invention a seat cushion frame is provided having a forward pan portion and laterally spaced rearwardly extending side members. A resilient back bar replaces the conventional rigid back bar and is positioned forwardly of the attachment point of the conventional rigid back bar. Flexure of the resilient back bar assures comfort of the front seat occupant and by virtue of its location forwardly of the conventional rigid back bar increases the foot room available to the rear seat occupant. Additional resilient bars are extended between the laterally spaced side members of the seat cushion frame forwardly of the back bar to provide additional seat cushion suspension members. The resilient back bar and the additional resilient cushion suspension members are preferably made of a single sheet or diaphragm of elastic material such as fabric reinforced rubber. Slots cut in the diaphragm divide it into the desired number of bars connected by uncut portions near their ends. A wire clip is sewn into the diaphragm at the end of each bar and the clips are received in holes in the side members so that the bars are tensioned to varying degrees to provide the desired feel. The seat trim at the rear of the bucket seat cushion is passed beneath the resilient back bar and the resilient suspension members and attached by conventional rings to the rear edge of the pan portion of the seat cushion frame.

One feature of the invention is the provision of a back bar located forwardly of the conventional position of a seat cushion back bar so as to increase the foot room for the rear seat occupant.

Another feature of the invention is the provision of a resilient back bar for a front bucket seat cushion which yields under weight of the front seat occupant to provide the desired feel.

A further feature of the invention is an integral back bar and seat suspension assembly including a diaphragm of resilient material slit into interconnected strips or bars which may be tensioned to varying degrees to provide the desired seat cushion feel.

These and other features, objects, and advantages of the invention will become apparent upon consideration of the appended specification and the drawings in which:

FIG. 1 is a side elevation view of a front bucket seat embodying the invention;

FIG. 2 is a plane view of a seat cushion frame assembly embodying the invention;

FIG. 3 is an enlarged sectional view taken in the direction of arrows 3—3 of FIG. 2, and FIG. 4 is an enlarged view taken in the direction of arrows 4—4 of FIG. 2.

Referring to FIG. 1, a front bucket seat 10 includes a seat back 12 and a seat cushion 14. The seat cushion 14 is mounted on a seat cushion frame assembly 16 which is in turn attached to the floor 18 of the vehicle body by respective front and rear legs 20 and 22. The rear legs 22 are spaced laterally providing therebetween a space in which the phantom line indicated feet 24 of the rear seat occupant may be placed.

The seat back 12 includes an outboard J-shaped support arm 26 attached to the seat cushion frame assembly by a pivot 28 and a like inboard support arm not shown, which mount the seat back 12 on the seat cushion frame assembly for forward pivotal movement from the use position shown in FIG. 1 to an easy-enter position facilitating ingress to and egress from the rear seat.

Referring to FIGS. 2 and 3 the seat cushion frame assembly is shown as a sheet metal stamping having a front pan portion 30 and laterally spaced like rearwardly extending side members 34 and 36. The stamped seat cushion frame is flanged downwardly and inwardly at its edge portions to provide added strength. The side members 34 and 36 of the seat cushion frame assembly 16 are curved upwardly as seen in FIG. 3 and have mating stepped inwardly flanged portions 38, 40 and 42. A resilient diaphragm assembly generally indicated at 44 includes a single elastic sheet of fabric reinforced rubber which is die-cut or slit to provide a resilient back bar 46 and resilient seat cushion suspension members 48 and 50 which are interconnected by uncut portions 52. The ends of the resilient back bar 46 and the seat cushion suspension members 48 and 50 are reverse folded about hooks 54 as shown in FIG. 4 and sewn to connect the hooks 54 thereto. The hooks 54 are in turn received in holes 56 in the stepped flanges 38, 40 and 42 of the side members 34 and 36 to stretch the diaphragm 44 taut between the side members 34 and 36. The diaphragm 44 is preferably die-cut with the seat cushion suspension members 48 and 50 thereof being of shorter length than the resilient back bar 46, causing them to be stretched more tightly and accordingly having a higher resistance to flexure under the weight of the seat occupant. The resilient back bar portion 46 of the diaphragm assembly 44 is located forwardly of the normal location of the rigid back bar of the prior art to increase the foot room available to the rear occupant. The resilient construction of the back bar 46 permits sufficient flexure thereof to comfortably seat the front seat occupant regardless of this more forward location. As shown in FIG. 1, a conventional seat cushion 56 of foam material is placed on the pan portion 30 and across the diaphragm assembly 44. The seat covering, not shown, is placed over the cushion and behind and beneath the resilient back bar 46 and beneath the resilient seat suspension members 48 and 50 and attached by conventional rings to spaced apertures 58, FIG. 2 in the rearward edge of the seat pan portion 40.

Thus it is seen that a seat cushion frame assembly is provided which increases the foot room for the rear seat occupant while maintaining a desired cushion feel for the front seat cushion.

What is claimed is:

1. A seat cushion frame assembly for a motor vehicle bucket seat comprising a seat cushion frame having a front pan portion and laterally spaced side members extending rearwardly from the front pan portion, and a resilient diaphragm attached in tension between the side members and having a rearward back bar portion, the side members curving upwardly to locate the back bar portion of the resilient diaphragm in a relatively high and forward position permitting location of the feet of the rear seat occupant therebeneath.

2. A seat cushion frame assembly for a motor vehicle bucket seat comprising; a cushion frame having a front pan portion and laterally spaced side members extending rearwardly from the front pan portion and being curved upwardly, a resilient back bar attached in tension between the side members at the rearward ends thereof, and a plurality of resilient seat cushion suspension bars attached in tension between the side members forwardly of the back bar, the back bar and plurality of resilient cushion suspension bars being provided by a single sheet of resilient material slit into a plurality of bars connected by unslit portions to permit the plurality of resilient cushion suspension bars to assume the upwardly curving contour of the side members and to be variably tensioned.

3. A seat cushion frame assembly for a motor vehicle bucket seat comprising; a cushion frame having a front pan portion and laterally spaced side members extending rearwardly from the front pan portion and being curved upwardly, the laterally spaced side members having a plurality of paired stepped discrete planar surfaces, a resilient back bar attached in tension between the rearwardmost planar surfaces of the side members and a plurality of resilient seat cushion suspension bars attached in tension between the others of the paired planar surfaces of the side members forwardly of the back bar, the back bar and plurality of resilient cushion suspension bars being provided by a single sheet of resilient material slit into a plurality of bars connected by unslit portions and permitting the plurality of resilient cushion suspension bars to assume the plane of the associated planar surfaces of the side member.

* * * * *